Aug. 10, 1943.   L. J. WHITE   2,326,187
LIQUEFIED GAS SYSTEM
Filed Oct. 12, 1939   3 Sheets-Sheet 1

Inventor
L. J. White
By A. D. Adams
Attorney

Aug. 10, 1943.          L. J. WHITE          2,326,187
LIQUEFIED GAS SYSTEM
Filed Oct. 12, 1939          3 Sheets-Sheet 2
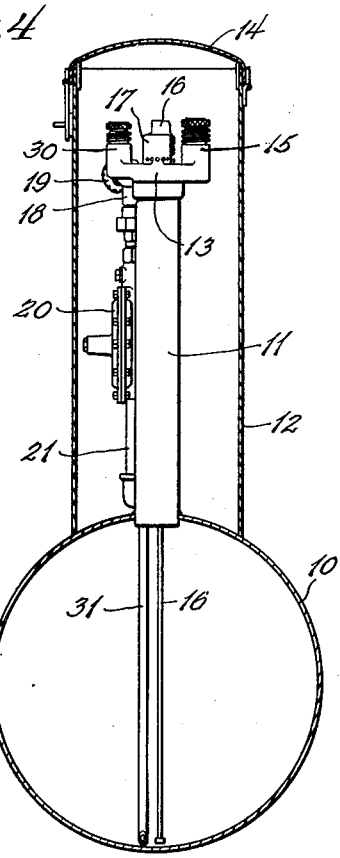
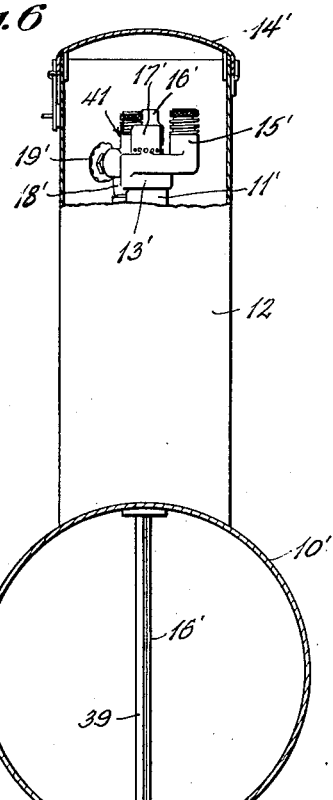
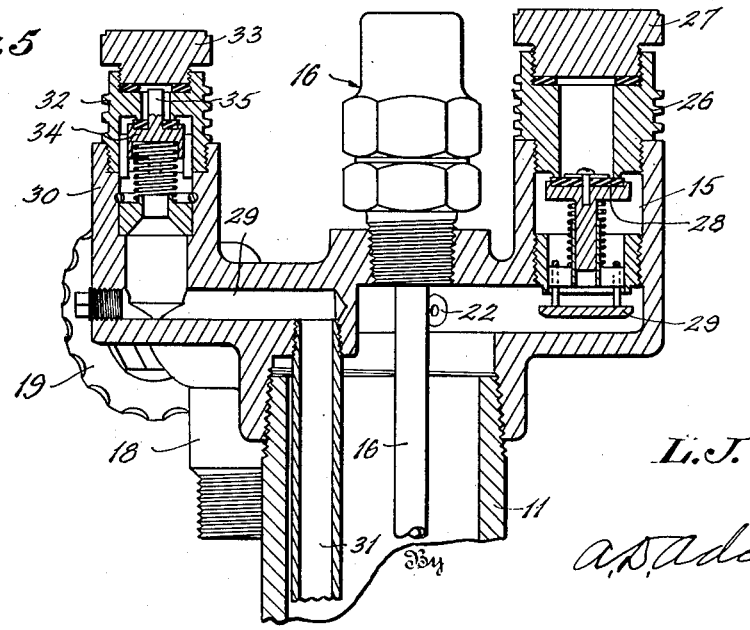
Inventor
L. J. White
By A. D. Adams
Attorney Aug. 10, 1943.                L. J. WHITE                    2,326,187
                          LIQUEFIED GAS SYSTEM
                        Filed Oct. 12, 1939            3 Sheets-Sheet 3
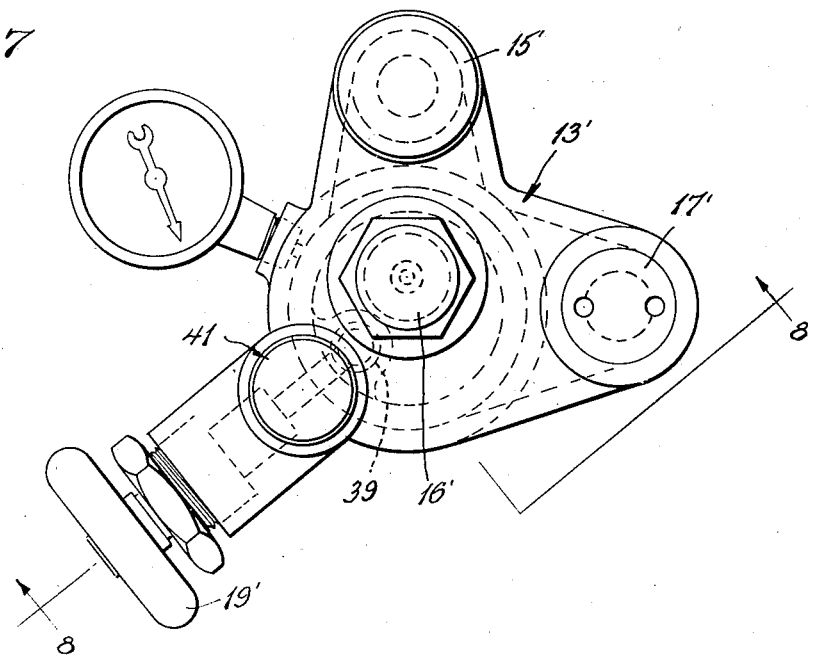
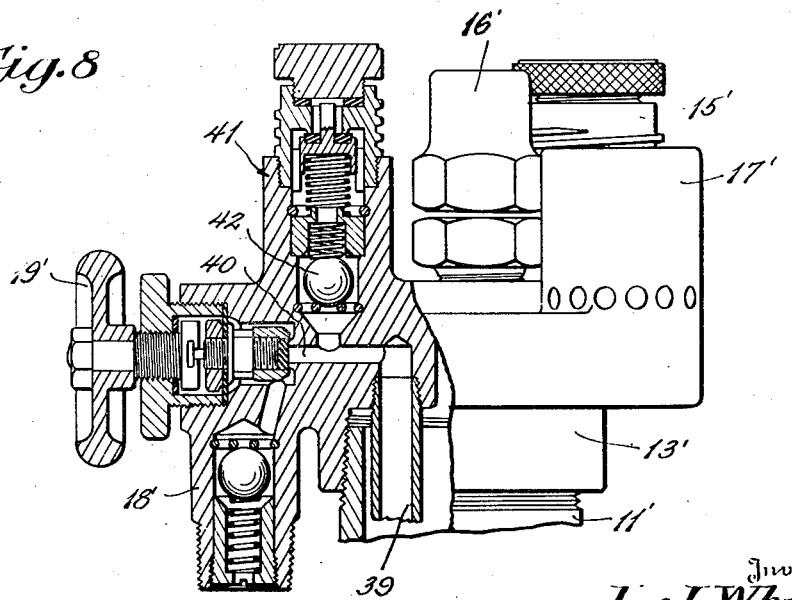
Inventor
L. J. White
By A. D. Adams
Attorney Patented Aug. 10, 1943

2,326,187

UNITED STATES PATENT OFFICE 2,326,187

LIQUEFIED GAS SYSTEM

Loyd J. White, San Antonio, Tex., assignor to Southern Steel Company, San Antonio, Tex., a corporation of Texas Application October 12, 1939, Serial No. 299,211

9 Claims. (Cl. 62—1)

This invention relates to liquefied gas storage and dispensing systems and, among other objects, aims to provide a system including an improved underground tank and having novel means for evacuating the tank and transferring the liquid from it to a service truck tank in the case of emergency or for any reason, especially when the tank requires removal for repairs, replacement or reclaiming. Another object of the invention is to provide a liquid evacuating attachment for a unitary fitting or head whereby the liquefied gas may be removed from the tank by connecting a hose carried by a service truck tank to the fitting and reversing the filling pump on the truck to pump the liquid from the underground tank to the truck tank.

Other aims and advantages of the invention will appear in the specification, when considered in connection with the accompanying drawings, wherein:

Fig. 4 is an enlarged vertical sectional view taken on the line 4—4 of Fig. 1;

Fig. 5 is an enlarged vertical sectional view of a valved unitary fitting shown in Fig. 4;

Fig. 6 is a view similar to Fig. 4 but showing the invention embodied in a liquid eduction system;

Fig. 7 is an enlarged top plan view of the unitary fitting shown in Fig. 6; and

Fig. 8 is a vertical sectional view taken on the line 8—8 of Fig. 7.

Figure 1:
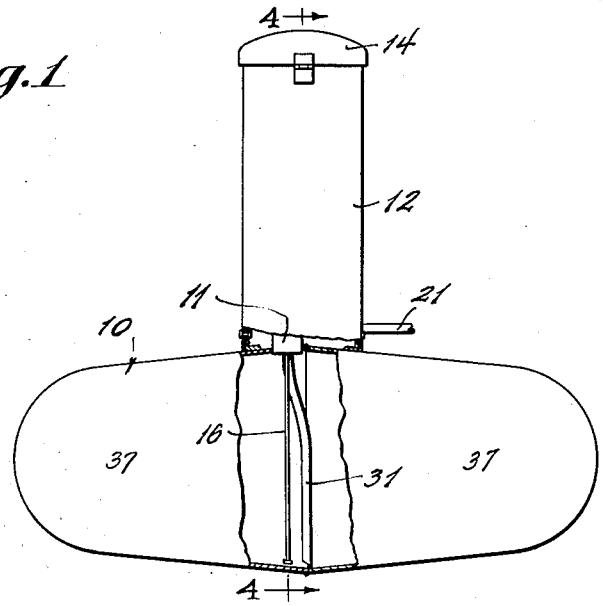
Fig. 1 is a side elevation, partly in section, of one type of system embodying the invention.

Referring particularly to the drawings, the preferred form of the invention there shown is embodied in a system including a storage tank 10 adapted to be buried in the ground below the frost line to absorb heat from the surrounding earth and having a standpipe 11 extending upwardly therefrom into a protecting casing 12.

The standpipe is shown as carrying a unitary fitting 13 at its upper end accessible from the ground level through the top of the casing when the removable cover 14 thereof is open. The tank is adapted to be filled and vapor discharged therefrom through the standpipe and fitting. The fitting is similar to that shown in my Patent No. 2,121,675 and includes all of the necessary filling and dispensing appurtenances, such as a valved filling conduit 15, a slip tube gauge 16, a pressure relief valve 17 and a dispensing branch 18 having a cut-off valve 19 and leading to a pressure reducing regulator 20 from which the gas vapor at reduced pressure is carried underground through a service pipe 21 to the point of use. The fitting also preferably carries an ordinary pressure gauge (not shown), having a screw threaded nipple connected therewith. The end of the nipple is indicated at 22 in Fig. 5.

The system shown in the aforesaid patent is adapted to be filled by gravity and the displaced vapor in the tank conveyed to the truck tank through a vapor return line. In this instance, however, the system is adapted to be filled by pressure; that is, a hose 23 carrying the usual cut-off valve, is connected at one end to a pump 24 on the service truck tank 25 and at the other end to a hose fitting 26 on the filling conduit 15 after the plug 27 is removed for this purpose. The liquid in the tank is then forced under pressure into the underground tank through the standpipe 11. The filling conduit carries a check valve 28 which opens when the liquid is being pumped into the tank, and a back flow check valve to prevent the escape of gas when the valve 28 is removed for replacement or repairs. These valves are substantially the same as those shown in the aforesaid patent.

The latest regulations of the fire underwriters require that underground liquefied petroleum gas systems shall have all liquid removed from the tank before it is taken out of the ground for repairs, replacement or other reasons. Therefore, it is necessary that some reliable means be provided to evacuate the tank. To that end, the fitting is provided with an integral, lateral-branch conduit 29 having an upstanding extension 30 at its outer end. A tube 31 is shown as being connected to the inner end of the conduit 29 and extends downwardly through the standpipe to the bottom of the tank. The extension 30 carries a hose fitting 32 closed by a plug 33. In the upper end of the extension 30 and within the fitting 32, there is shown a spring urged check valve 34 having a stem 35 adapted to be engaged by a hose when it iss crewed on the fitting, automatically to open the valve. The valve will close to prevent escape of liquefied gas when the hose is disconnected.

Figure 2:
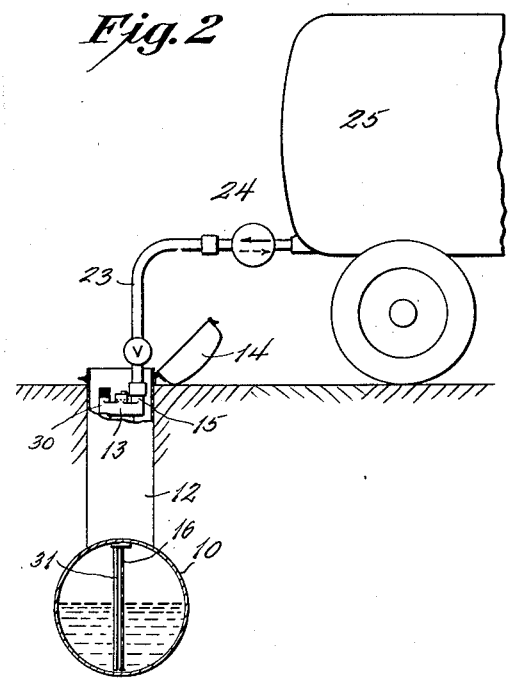
Fig. 2 is a diagrammatic view of the system showing the storage tank buried in the ground and connected to receive liquefied gas from a service truck tank.
Figure 3:
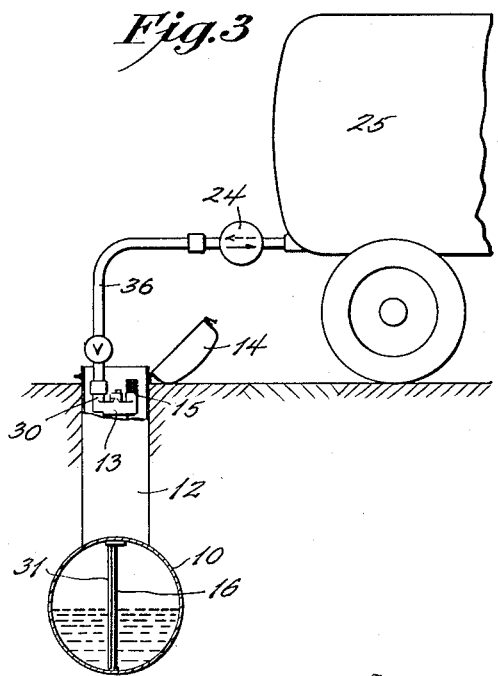
Fig. 3 is a similar view showing the storage tank connected to transfer the liquefied gas to the service truck tank.

Referring to Fig. 3, it will be observed that when it is desirable to empty the tank 10, an evacuating hose 36 is connected at one end to the fitting 32 and, at the other end, to the pump 24. The pump is of the reversible type and, when the hose is connected as just described, and the pump operated in reverse direction to that shown in Fig. 2, the contents of the tank 10 will be withdrawn therefrom and pumped into the truck tank 25.

In order that practically all of the liquid in the tank 10 may be removed, it is necessary to provide a sump into which the lower end of the tube 31 may extend. To this end, the tank is so shaped as to produce a sump. Referring to Figs. 1, 5 and 6, the tank is shown as being made of two complementary, frusto-conical cup-shaped sections 37 closed at their smaller outer ends and secured together at their inner abutting edges by a circumferential weld. Thus, the tank will have its largest diameter in the middle portion, so that the liquid will drain from the ends to the center or sump portion, even when the tank settles unevenly or out of its horizontal position. The standpipe is shown as being secured to the tank on one side of the circumferential weld mainly for convenience of assembly. In order that the lower end of the tube 31 may be located as close as possible to the bottom of the sump, the tube, below the standpipe is bent or offset as shown and the extreme lower end is beveled as indicated at 38, so that the opening in the tube can never be closed by expansion or contraction of the tube or tank. Also, the bent tube leaves ample room below the standpipe for the operating mechanism of an ordinary float type gauge (not shown).

The system shown in Figs. 6, 7 and 8 is of the liquid eduction type generally like that disclosed in Patent 2,176,829, except that it is adapted to be pressure filled; although it may have the usual vapor return valve so that the tank can be either pressure-filled or gravity-filled. In the present example, the vapor return valve is omitted.

The tank 10', standpipe 11' and the casing 12' are the same as described in connection with Figs. 1 to 5. In this instance, the unitary fitting 13' is shown as also having a filler valve 15', a slip tube gauge 16', a safety relief valve 17' and service branch 18' carrying a cut-off valve 19'. The gas in this case, is delivered in the liquid phase to the service branch through a liquid eduction pipe 39 connected at its upper end to communicate with a horizontal outlet branch 40 in the fitting and extending to the bottom of the tank.

The liquid eduction pipe 39 is also employed as an evacuating tube, its lower end extending into the sump portion of the tank. The conduit or branch 40 is shown as having a vertical branch leading through an evacuating valve 41 like the valve shown in Fig. 5, except that it happens to be shown as including an ordinary spring-urged excess flow check valve 42 such as is sometimes necessary to comply with safety requirements. This arrangement of the evacuating valve eliminates the necessity of providing a separate branch in the fitting. It will be seen that the cut-off valve 19' will be closed when liquid is being pumped out of the tank and the evacuating valve closed when the cut-off is open to deliver gas to the service pipe. Furthermore, the design is very compact and the cost of production is reduced to a minimum, consistent with absolute safety.

From the foregoing description, it will be seen that the improvements may be applied to systems at very little added cost. Moreover, such systems comply fully with all ordinary safety requirements. Furthermore, by using a simple reversible pump and an extra hose on a service truck, the contents of an underground tank can be evacuated very quickly and reclaimed.

Obviously, the present invention is not restricted to the particular embodiments thereof herein shown and described. Moreover, it is not indispensable that all the features of the invention be used conjointly, since they may be employed advantageously in various combinations and sub-combinations.

What is claimed is:

1. In a liquefied petroleum gas dispensing system of the type described having a pressure storage tank, filling and dispensing means for the tank, said dispensing means being connected to gas consuming appliances; and a liquid eduction pipe extending to the bottom of the tank and having a hose fitting at its upper end and separate from the filling means whereby liquid in the tank may be withdrawn or pumped out through a connected hose without disconnecting said dispensing means.

2. In a liquefied petroleum gas dispensing system of the type described, a pressure storage tank having a sump portion; filling and dispensing means associated with the tank, said dispensing means being connected to gas consuming appliances; and means independent of the filling means extending through the wall of the tank into the sump portion and connected to evacuate the liquid contents from the tank without disconnecting said dispensing means.

3. In a liquefied petroleum gas dispensing system of the type described having a pressure storage tank and a standpipe connected thereto, a fitting connected to the upper end of the standpipe carrying filling and dispensing appurtenances; means connecting the dispensing appurtenance to gas consuming appliances; a valved conduit in said fitting having a hose connection; and a liquid eduction pipe spaced from the filling means, connected to said conduit and extending through the standpipe into the bottom portion of the tank, whereby the liquid contents of the tank may be withdrawn without disconnecting said dispensing means.

4. In a liquefied petroleum gas dispensing system of the type described having a pressure storage tank and a standpipe connected thereto, a fitting connected to the upper end of the standpipe carrying filling and dispensing appurtenances; a discharge conduit in said fitting having an outlet valve; and a liquid eduction pipe rigidly connected to the inside of said fitting communicating with said conduit and extending through the standpipe to the bottom of said tank, whereby the liquid in the tank may be evacuated.

5. In a liquefied petroleum gas dispensing system of the type described having a pressure storage tank and a standpipe connected thereto, a fitting connected to the upper end of the standpipe carrying filling and dispensing appurtenances; a sump portion in the bottom of said tank; an evacuating conduit extending from the fitting into said sump portion; and an evacuating valve on the fitting having a hose connection, whereby the liquid in the tank may be removed.

6. In a liquefied petroleum gas dispensing system of the type described having a pressure storage tank and a standpipe connected thereto, a single valved fitting on the standpipe carrying separate means to fill the tank, to dispense the gas and to evacuate the tank.

7. In a liquefied petroleum gas dispensing system of the type described having a pressure storage tank and a standpipe connected thereto, a unitary fitting on the standpipe having a filling valve and a dispensing conduit; a pipe projecting through the standpipe to the bottom of the tank and connected to said dispensing conduit; a cut-off valve connected to said dispensing conduit; and an evacuating valve having a hose connection on the fitting also communicating with said dispensing conduit, whereby the tank may be evacuated when the cut-off valve is closed.

8. In a liquefied petroleum gas dispensing system of the type described having a pressure storage tank and a standpipe connected thereto, a unitary fitting on the standpipe having a filling valve and a dispensing conduit; a pipe projecting through the standpipe to the bottom of the tank and connected to said dispensing conduit; a cut-off valve connected to said dispensing conduit; a vertical conduit in the fitting communicating with said dispensing conduit; and an evacuating valve in said vertical conduit accessible from above the ground.

9. In a liquefied petroleum gas dispensing system of the type described having a pressure storage tank and a standpipe connected thereto, a unitary fitting on the standpipe having a filling valve and a dispensing conduit; a pipe projecting through the standpipe to the bottom of the tank and connected to said dispensing conduit; a cut-off valve connected to said dispensing conduit; a vertical upstanding conduit in the fitting communicating with said dispensing conduit; an excess flow check valve in said vertical conduit; a valve casing on the fitting; an evacuating valve in said casing; and a hose fitting on said valve casing accessible from above the ground.

LOYD J. WHITE.